US006036089A

United States Patent [19]
Oguchi et al.

[11] Patent Number: 6,036,089
[45] Date of Patent: Mar. 14, 2000

[54] AUTOMATIC TRANSACTION APPARATUS

[75] Inventors: Yuzo Oguchi; Haruhiro Tsuneta; Kazuyoshi Yasukawa; Sunao Yonekubo, all of Nagano, Japan

[73] Assignee: Sankyo Seiki Mfg. Co., Ltd., Nagano-ken, Japan

[21] Appl. No.: 08/892,041

[22] Filed: Jul. 14, 1997

[30] Foreign Application Priority Data

Jul. 19, 1996 [JP] Japan .................................... 8-190989

[51] Int. Cl.[7] ...................................................... G06F 17/60

[52] U.S. Cl. .......................... 235/379; 235/381; 235/487; 902/36; 902/40

[58] Field of Search .................................... 235/379, 381, 235/487; 902/36, 40

[56] References Cited

U.S. PATENT DOCUMENTS

| | | | |
|---|---|---|---|
| 5,019,249 | 5/1991 | Sugai et al. | 209/534 |
| 5,183,999 | 2/1993 | Hakenewerth et al. | 235/379 |
| 5,397,886 | 3/1995 | Mos et al. | 235/475 |
| 5,780,825 | 7/1998 | Sato et al. | 235/379 |
| 5,804,804 | 9/1998 | Fukatsu et al. | 235/379 |

FOREIGN PATENT DOCUMENTS 5-81510 2/1993 Japan .

*Primary Examiner*—Thien M. Le
*Assistant Examiner*—Daniel Felton
*Attorney, Agent, or Firm*—McAulay Nissen Goldberg Kiel & Hand, LLP

[57] ABSTRACT

An automatic transaction apparatus comprises a media operation unit having a card access port and paper currency depositing/receiving port and a housing unit which includes a card process portion and a plurality of paper currency dispenser portions which are positioned at the side of the card access port and the paper currency depositing/receiving port. Also included are a slider portion which is arranged to be movable in a given direction behind the card access port and the paper currency depositing/receiving port and in front of the card process portion and the plurality of paper currency dispenser portions. Further included are a transport unit which is supported by the slider portion, and which has a chuck portion which is movable between the operation unit and the housing unit. A controller also forms part of the apparatus; the controller controls movement of the slider portion and the chuck portion. The media operation unit is designed so that it moves to a position corresponding to the card insertion portion or paper currency depositing/receiving portion on the media operation unit to receive different media such as a card or paper currency from the chuck portion. The slider portion is designed so that it moves to the position corresponding to the card process portion or the plurality of paper currency dispenser portions of the housing unit to deliver the different media thereto.

13 Claims, 6 Drawing Sheets

AUTOMATIC TRANSACTION APPARATUS

BACKGROUND OF THE INVENTION a) Field of the Invention

The present invention relates to an automatic transaction system which can simultaneously process a plurality of media such as bank cards, bank statements, and paper currency.

b) Description of the Related Art

Japanese Patent Kokai 5-81510 discloses a paper processor, in which a robot transfers papers by gripping them by a grip to and from a paper storage formed in an automatic transaction system body and its destination. U.S. Pat. No. 5,183,999 also discloses a self-served transaction system in which a robot, being built into the system, transfers papers and a card to and from a card access port and a paper currency depositing/receiving port, a card processor or a paper dispenser installed in the system.

In the system mentioned in the above Japanese Kokai H-5-81510 or U.S. Pat. No. 5,183,999, a card inlet or paper currency depositing/receiving port are formed as a part of the entire panel which constitutes the exterior of the system. Therefore, when media of different types, sizes, and shapes need to be handled, the system must be redesigned to fit each of the processing units in the system corresponding to each of the media access ports formed on the operation (user interface) panel. This increases development time and manufacturing cost. In addition, the system disclosed in Japanese Patent Kokai H-81510 is capable of handling papers (paper currency) but is not capable of handling cards or bank statements. Also, in the system disclosed in U.S. Pat. No. 5,183,999, a robot handles a plurality of media but its process time is long due to some problems in the arrangement of the media access ports and each of the process units in the system.

OBJECT AND SUMMARY OF THE INVENTION

The primary object of the present invention is to provide an automatic transaction system which can universally handle a variety of media without changing the physical location of access ports or currency depositing/receiving ports and can transfer media so smoothly that it reduces the chance of damaging the media.

In accordance with the invention, an automatic transaction apparatus comprises a media operation unit having a card access port and paper currency depositing/receiving port and a housing unit which includes a card process portion and a plurality of paper currency dispenser portions which are positioned at the side of the card access port and the paper currency depositing/receiving port. Also included are a slider portion which is arranged to be movable in a given direction behind the card access port and the paper currency depositing/receiving port and in front of the card process portion and the plurality of paper currency dispenser portions. Further included are a transport unit which is supported by the slider portion, and which has a chuck portion which is movable between the operation unit and the housing unit. A controller also forms part of the apparatus; the controller controls movement of the slider portion and the chuck portion. The media operation unit is designed so that it moves to a position corresponding to the card insertion portion or paper currency depositing/receiving portion on the media operation unit to receive different media such as a card or paper currency from the chuck portion. The slider portion is designed so that it moves to the position corresponding to the card process portion or the plurality of paper currency dispenser portions of the housing unit to deliver the different media thereto.

DESCRIPTION OF THE PREFERRED EMBODIMENTS

Figure 1:
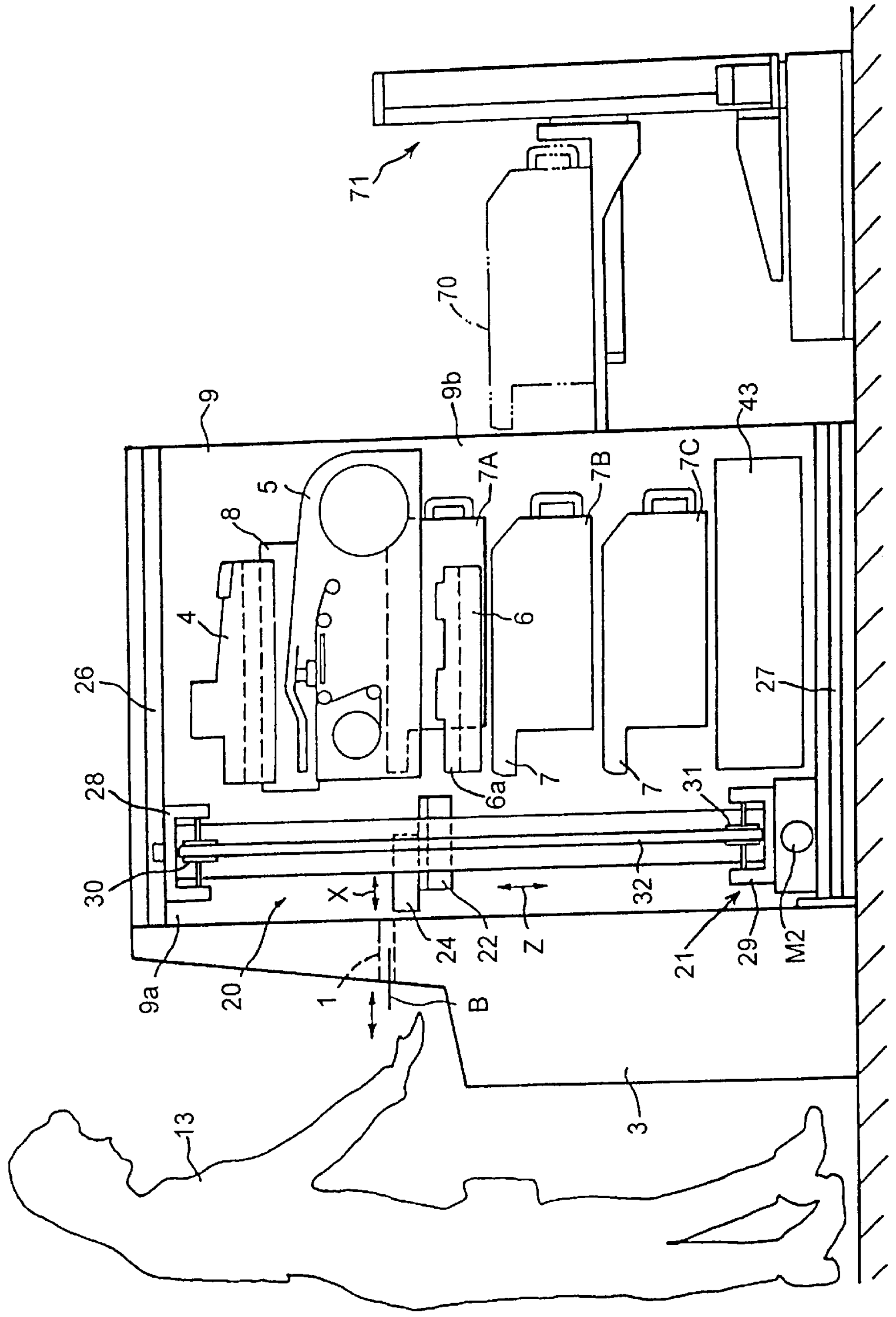
FIG. 1 is a side view showing a schematic diagram of the automatic transaction apparatus of Embodiment 1 of the present invention.

In the automatic transaction system of the present invention, a transport unit is formed between a housing unit in which there are a card processing unit and a plurality of paper currency dispensers such that the media operation unit for one media in a housing unit can be replaced with that for another media, wherein the transporting unit grips and transports different types, shapes, and sizes of media such as cards or papers received from a card access port formed on a medium operation unit or paper currency depositing/receiving port formed in a media operation unit.

The transport unit comprises:

a slider portion, which is capable of moving up and down or right and left, if needed, behind a card access port and a paper currency depositing/receiving port, in front of a card process unit and a plurality of paper currency dispensers; and a chuck portion unit, which is supported such that it can move between the media operation unit and the housing unit; and a controller moves the chuck portion unit together with a slider portion unit to the position corresponding to the card access port or a paper currency depositing/receiving port such that the chuck portion grips cards or paper currency. Then, the slider portion, which is joined with the chuck portion, transports them to the position which corresponds to a card processor or a plurality of paper currency dispensers. The resulting cards or paper currencies are then received by the card processing unit or a plurality of paper currency dispensers.

Opposite a housing unit, which is provided with a card process unit and a plurality of paper currency dispensers, a replaceable media operation unit, which has a card access port and a paper currency dispenser, may be installed. If a transport unit, which grips media of different types, shapes, and sizes such as cards or paper currencies is formed for delivering from the card access port or paper currency access port to a card process unit or a plurality of paper currency dispensers, if the media operation unit is replaced with a new one having a card access port and paper currency depositing/receiving port at different locations, cards or paper currencies can be transferred to a card processing unit or paper currency dispenser in the housing unit only by changing the transfer unit motion. This configuration does not require changing the layout in the housing unit. It is preferable in this configuration that a media operation unit and the transport unit shares the same configuration for the media delivery so that the same unit can be used for handling different media without redesigning the arrangement of each of the process units of the housing unit.

In addition, when the housing unit is equipped with a bank statement printer, the shared access port is used as a card-statement common access port. The system is also equipped with a sensor which checks whether the inserted media is a card or a statement book. In this case, based on the data put out from the sensor, the slider portion unit and the chuck portion units are move to the position which corresponds to the bank statement book to deliver. Thus, the automatic transaction system can handle media of different kinds, sizes, and shapes.

The slider portion which constitute the transport unit comprises a pair of:

a first slider portion unit having a first chuck portion unit which grips a medium inserted through a card access port, and a second slide unit having a second chuck portion unit which grips paper currencies, etc. wherein the first slider portion and the second slider portion can be moved independently. In this way, a medium taken form the side of the media operation unit can be processed together with statement printing and paper currency dispensing almost simultaneously, thus reducing the data processing time.

Also by detecting the up and down or right and left movement of the slider portion unit by a drive means such as a motor with an encoder, a controller can receive the position data from the drive means to control even a plurality of slider portion units without causing interference among their movements.

The automatic transaction system shown in FIG. 1 processes a plurality of media B. In this system, a media operation unit 3 on which a card access port 1 and a paper currency depositing/receiving port 2 are made detachable from a processing unit comprising:

a statement printer 4;

a receipt printer 5;

a card reader, which is a card processor; and a housing unit 9 formed with a plurality of paper currency dispensers 7A, 7B, 7C, and envelope receiver 8.

Figure 2C:
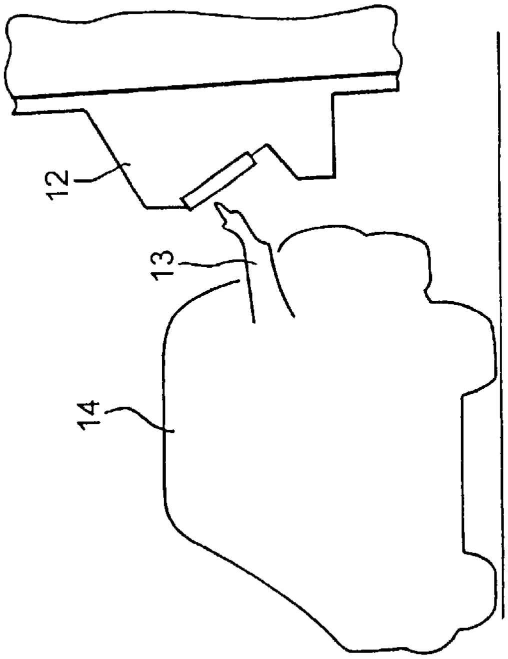
FIGS. 2*a*, 2*b* and 2*c* are side views showing a modified example of the media operation panel.
Figure 2B:
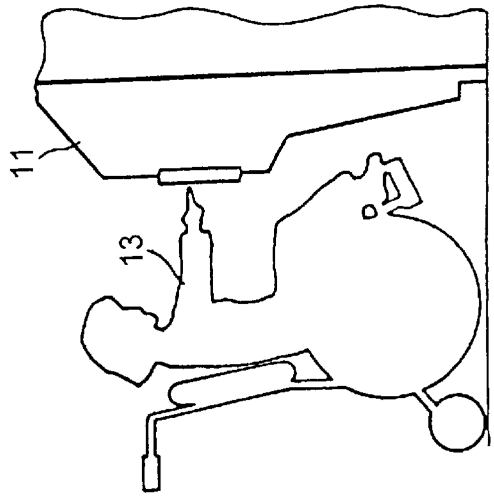
Figure 2A:
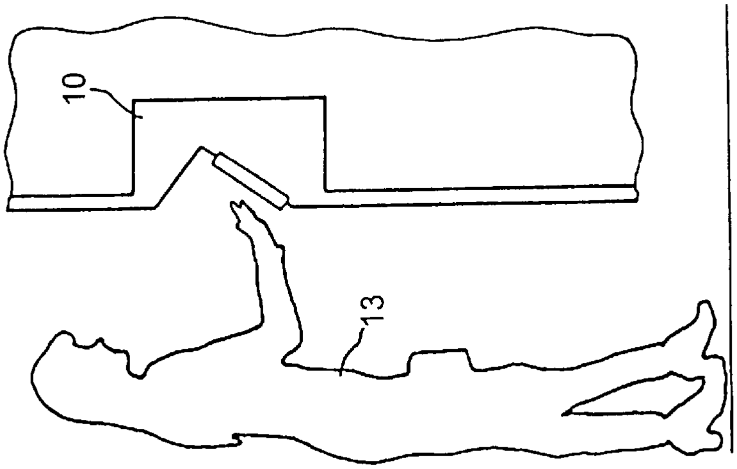

Media operation unit 3 can be replaced with other media operation panels 10, 11, 12 shown in FIGS. 2*a*, 2*b*, and 2*c*.

On media operation panel 3, a card access port is formed in the direction horizontal to a waist line of a system user 13 standing in front of the system. He operates the system in the direction almost horizontal to the panel surface. On media operation panel 10, the user operates the system at his breast line while standing in front of the system. On media operation panel 11, the user operates the system as he sits in front of the system. On media operation panel 12, the user operates the system as he sits in a car 14. In the present invention, these media operation panels 3, 10, 11, and 12 are configured such that any of them can be mounted to a common housing unit 9 or any of them can be replaced with other panels. In other words, the media operation unit and transport unit have a common delivery structure and the media operation unit and the housing unit has a common mounting unit.

Figure 4:
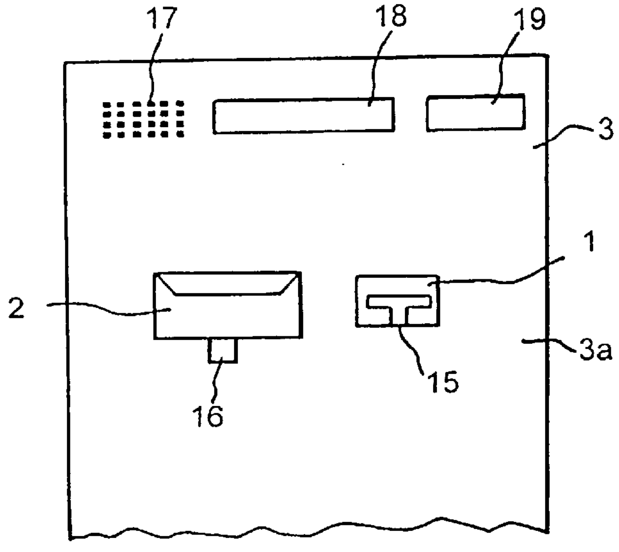
FIG. 4 is a partial cut out magnified diagram showing a front end of the media operation panel.

The front end 3*a* of the media operation panel 3 includes:

a card access port 1, shown in FIG. 4, through which a card C as an example of media B is inserted or ejected, and a paper currency depositing/receiving port 2, through which a paper currency A as an example of media B, are formed horizontally. Under the card access port 1 and paper currency depositing/receiving port 2, sensors 15, 16 consisting of photo sensors or CCD sensors which detect media B are arranged.

The front end 3*a* also includes:

a speaker 17, which outputs voice signals;

a display unit 18, 19, which indicates the amount or contents of the transaction, both of which are located at an appropriate position. The lower section of the front end 3*a* includes:

a keyboard, not illustrated, through which numbers or characters can be input and various buttons, which switch transactions upon selection, both of which are arranged in a normal manner.

In the same manner, media operation panels 10, 11, 12 shown in FIGS. 2*a*, 2*b* and 2*c* include:

a card access port;

a paper currency depositing/receiving port;

sensors; and other various user interface components.

They are formed in a different manner based on the user's posture and physical height. Particularly, media operation panel 10, 12, is sloped at an angle such that the user can easily access a card access port, a paper currency depositing/receiving port, a keyboard and selection buttons.

Figure 3:
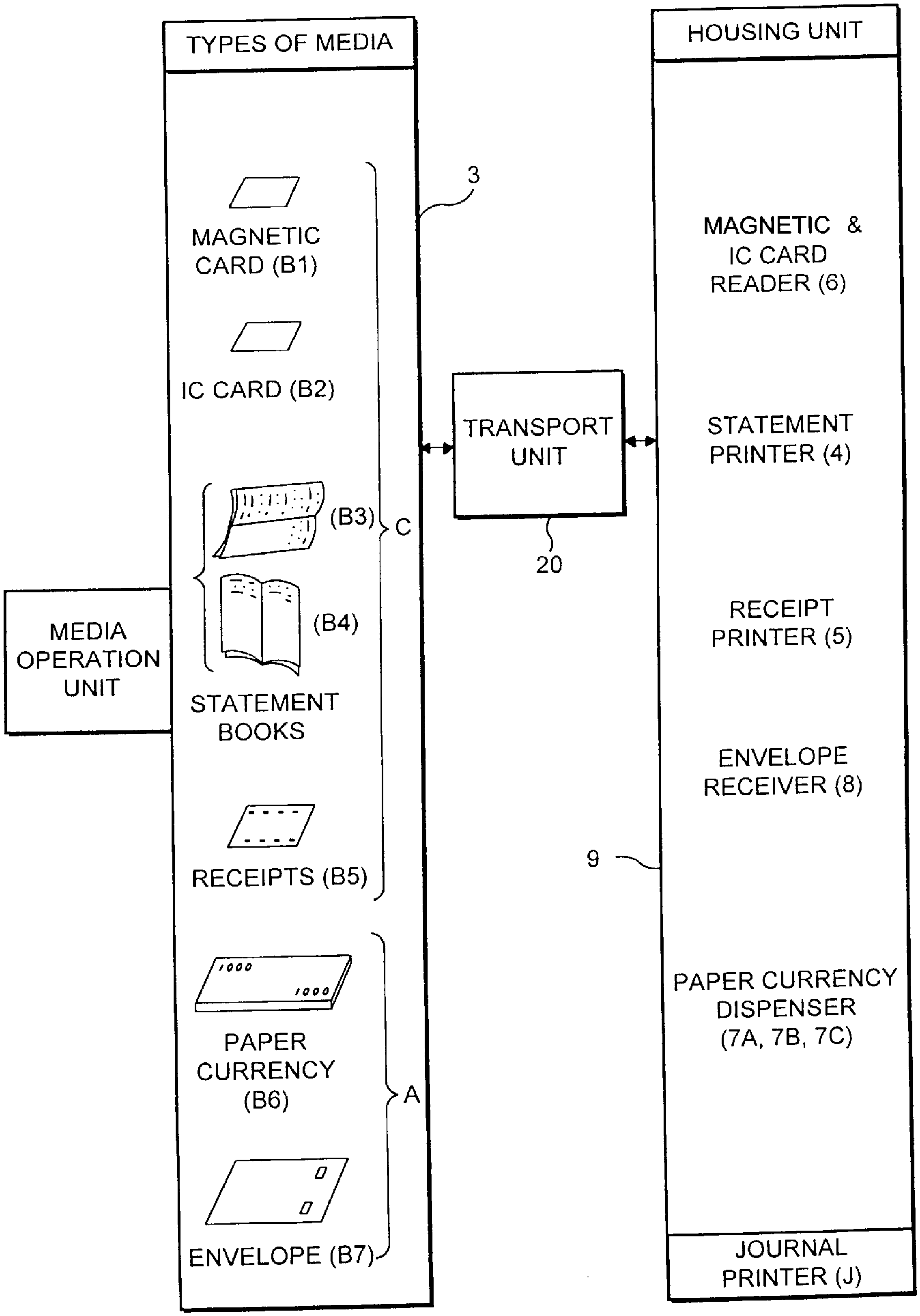
FIG. 3 is a block diagram showing the layout of the major unit of the automatic transaction apparatus, media, and process units which faces media.

Examples of media B are illustrated in FIG. 3. Media B can be classified into cards C and paper currency A.

Cards C include:

a magnetic card B1 or an IC card B2 or a bank statement book B3, which reads vertically;, a bank statement book B4 which reads horizontally;, and a receipt B5.

Paper currencies include:

paper currency B6 and envelops B7 containing checks.

Magnetic card B1, IC card B2, each of the statement books B3, B4, and receipts B5 are inserted or ejected through a card access port 1; paper currencies A, such as paper currency B6 or envelopes B7, are inserted/ejected through the paper currency depositing/receiving port 2. Note that a journal printer J may be built into the housing unit 9 as required.

Figure 5:
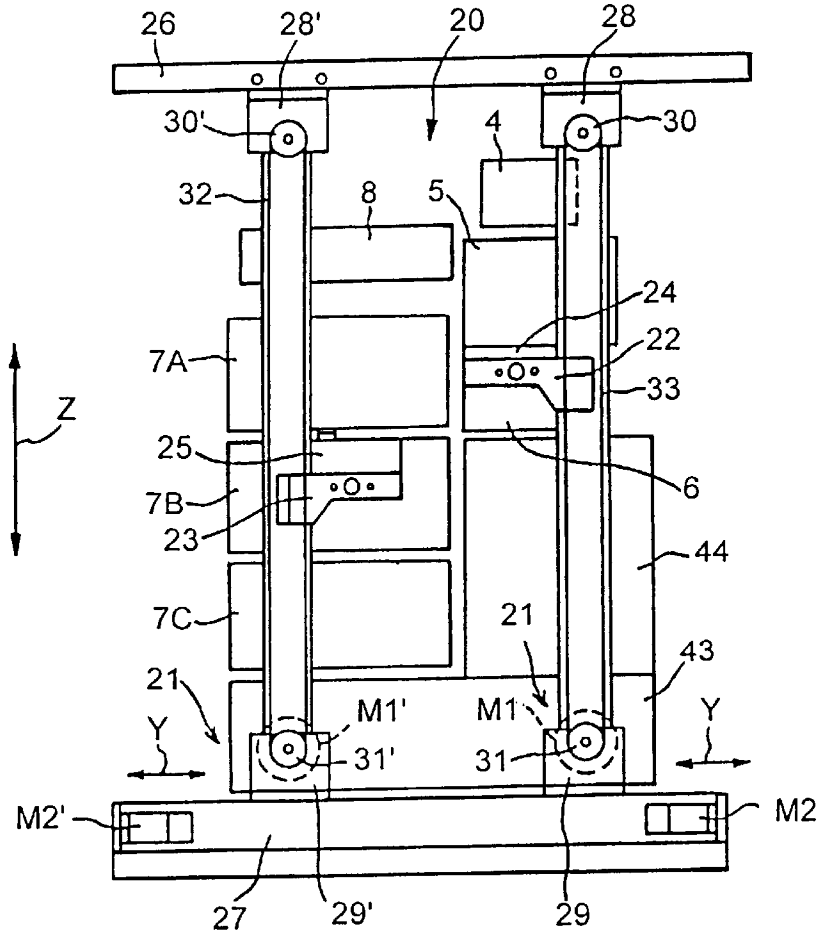
FIG. 5 is a front view showing a layout within the housing unit.

Statement printer 4, receipt printer 5, and card reader 6 are layered in the vertical direction with spaces between them in the housing unit such that they face the card access port 1 side as shown in FIG. 5. Paper currency dispensers 7A, 7B, 7C and envelope receiver 8 are layered vertically with spaces between them in the housing unit such that they face the paper currency depositing/receiving port 2. Each of these processing units are given unique functions. Paper currency dispensers 7A, 7B, 7C contains different types of paper currencies and can be stored in the system through back panel 9*b* side of the automatic transaction system.

Statement printer 4 is given an in-take function for printing statement books B3, B4 transported by transport unit 20 described later. Card reader 6 is given an in-take/reject function and a data read/write function for the magnetic card B1 or the IC card B2. Paper currency dispensers 7A, 7B, 7C are given an accounting and in-take or eject function for inserted paper currencies B6 deposited. Receipt printer 5 is given a function for printing the contents of transactions on a rolled paper with a built-in printing unit, for cutting the rolled paper when printing is finished and for ejecting the receipt. Envelope receiver 8 is given a function for taking envelope B7 containing checks which is transported by transport unit 20.

In the space between media operation unit 3 and housing unit 9, a transport unit 20 is formed such that it grips cards C or paper currencies A from a card access port 1 or paper currency depositing/receiving port 2 to transport them to a given process unit in housing unit 9. The transport unit 20 comprises:

first slider portion 22, which moves up and down as indicated with the arrow Z in FIG. 1, second slider portion 23, which moves right and left as indicated with the arrow Y (the direction horizontal to the access port side) in FIG. 5;

first chuck portion 24 contactingly supported by first slider portion 22; and a second chuck portion 25 contactingly supported by second slider portion 23.

First slider portion 22 and first chuck portion 24 correspond to cards C which are inserted/ejected through a card access port 1;

second slider portion 23 and second chuck portion 25 correspond to paper currencies A which are inserted/ejected through paper currency depositing/receiving port 2. It is preferable that metals are used for the set of first slider portion 22 and first chuck portion 24 and also the set of second slider portion 23 and second chuck portion 25 in terms of physical strength. However, it is more preferable that light metals such as aluminum or engineering plastics are used for the slider portions and chuck portions because they must be fixed onto belts 32, 33.

Transport unit 20 is driven by drive means 21 which is capable of detecting the positions in the up-down and right-left directions.

Drive means 21 comprises:

pulleys 30, 31, which are formed rotatably on base assemblies 28, 28', 29, 29' contactingly supported by rail frames 26, 27 on the upper and lower levels of housing unit 9 in the Y arrowed direction;

a y-axis drive portion, which rotates belts 32, 33 by drive motors M1, M1' with an encoder for the z axis; and a y-axis drive portion, which contactingly drives base assemblies 29, 19' in the Y-axis direction by drive motors M2, M2' having an encoder formed on a rail frame.

Figure 6:
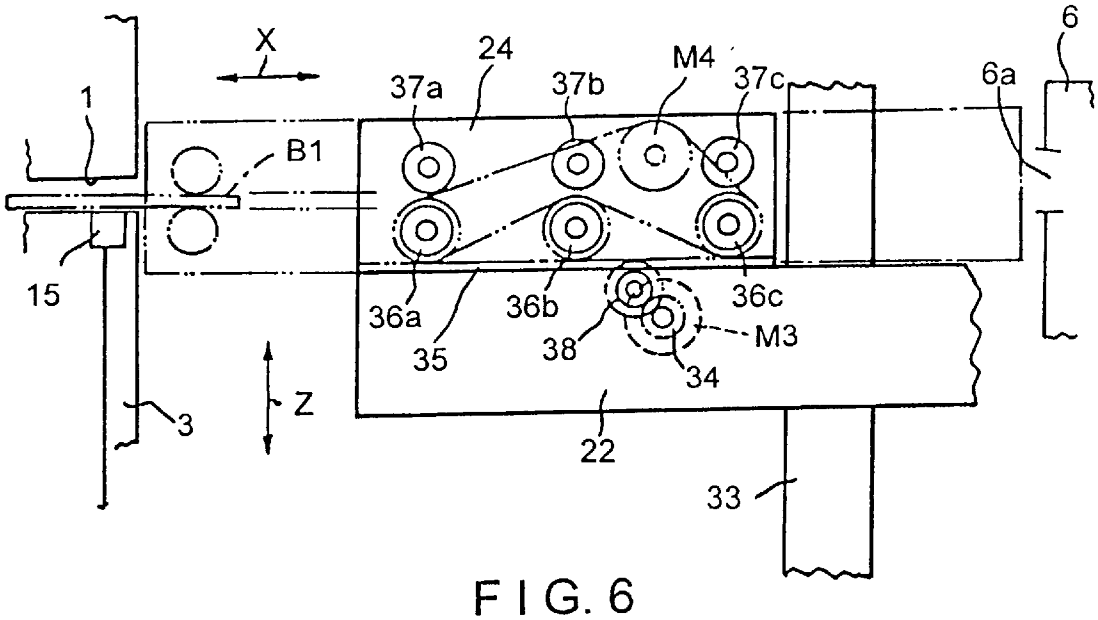
FIG. 6 is a magnified diagram showing a configuration of the first slider portion and the first chuck portion.

First slider portion 22 sandwiches belt 33 which moves up and down therebetween, as shown in FIG. 6, and is fixed on to the belt horizontally. Drive motor M3, which is rotatable in both the clockwise and counterclockwise directions, is attached to first slider portion 22. Pinion gear 34 is fixed onto the motor shaft. Drive motor M3 constitute the drive motor for the axis.

At the bottom of first chuck portion 24, rack 35 extending in the arrowed x direction is arranged. First chuck portion 24 is contactingly movable in the arrowed x direction by moving rack 35 via idler gear 38 which exists between pinion 34 and rack 35. In first chuck portion 24, a plurality of drive rollers 36*a*, 36*b*, 36*c*, which are rotated by drive motor M4 attached to the chuck portion 24; slave rollers 37*a*, 37*b*, 37*c* are arranged opposite the rollers in the arrowed x direction. Media B (cards C) are taken into the system through card access port 1 by a pair of these rollers, and are held in first chuck portion 24 to transport them therefrom.

Figure 7:
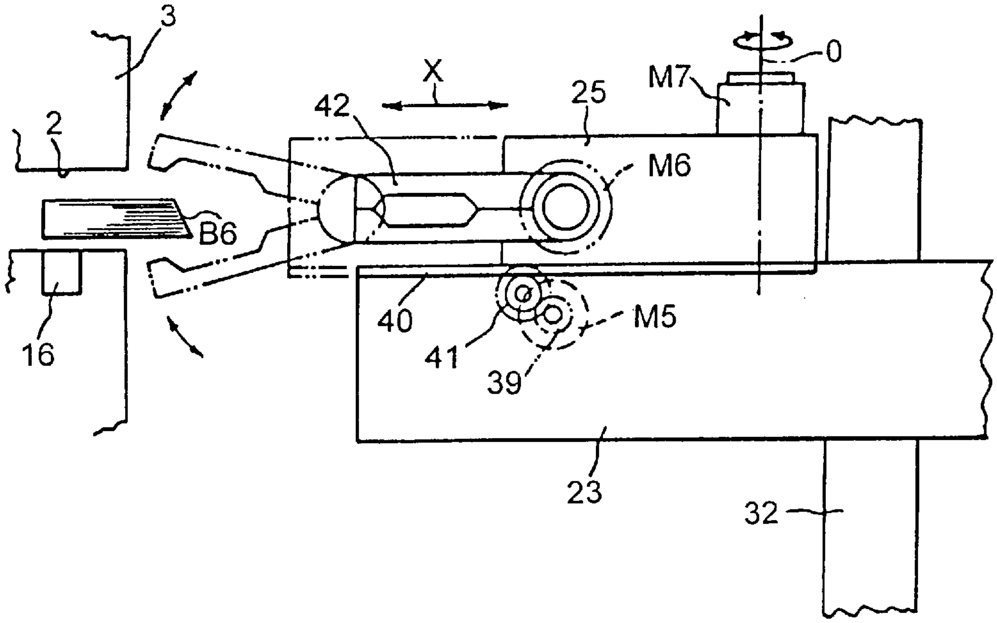
FIG. 7 is a magnified diagram showing a configuration of the second slider portion and the second chuck portion.

Second slider portion 23 sandwiches belt 32, which moves up and down therebetween, as shown in FIG. 7, is fixed on to the belt horizontally. Drive motor M5, which constitutes the x-axial drive motor for second chuck portion 25 and is rotatable in both the clockwise or counterclockwise direction, is attached to first slider portion 22. Pinion gear 39 is fixed onto the motor shaft.

At the bottom of second chuck portion 25, rack 40 extending in the arrowed x direction is arranged. Second chuck portion 25 is contactingly movable in the arrowed x direction by moving rack 40 via idler gear 41 which exists between pinion 39 and rack 40. In second chuck portion 25, grip 42, which opens and closes in the up and down directions by drive motor M6, is attached onto the chuck portion 25 such that it faces media operation unit 3 to grip media B (paper currencies A). Media B is inserted through paper currency depositing/receiving port 2 and transport them to a given process unit. Above second chuck portion 25, drive motor M7 is formed such that second chuck portion 25 can rotate around the axis O. This rotation can be made possible when second chuck portion 25 is at the initial position indicated with a solid. line as illustrated. These drive motors M3, M5 can be the x direction drive source for a slider portion. They also may constitute the X direction driving portion together with each of the gears or racks. Motors M4, M6 constitute the drive source for a chuck. Drive motor M7 constitute a rotation drive source. It is preferable that a guide plate not illustrated is formed on both sides of belts 32, 33 to avoid generating unwanted vibration in the slider and chuck portions.

At the bottom of housing unit 9, controller 43, which controls behavior of transport unit 20 and control unit 44, which controls the behavior of each of the processing units in housing unit 9 are formed.

Control unit 44 is connected to:

a statement printer 4;

a receipt printer 5;

a card reader 6;

paper currency dispensers 7A, 7B, 7C; and an envelope receiver 8.

Each of these components are electrically controlled by programs stored in the control unit.

Figure 8:
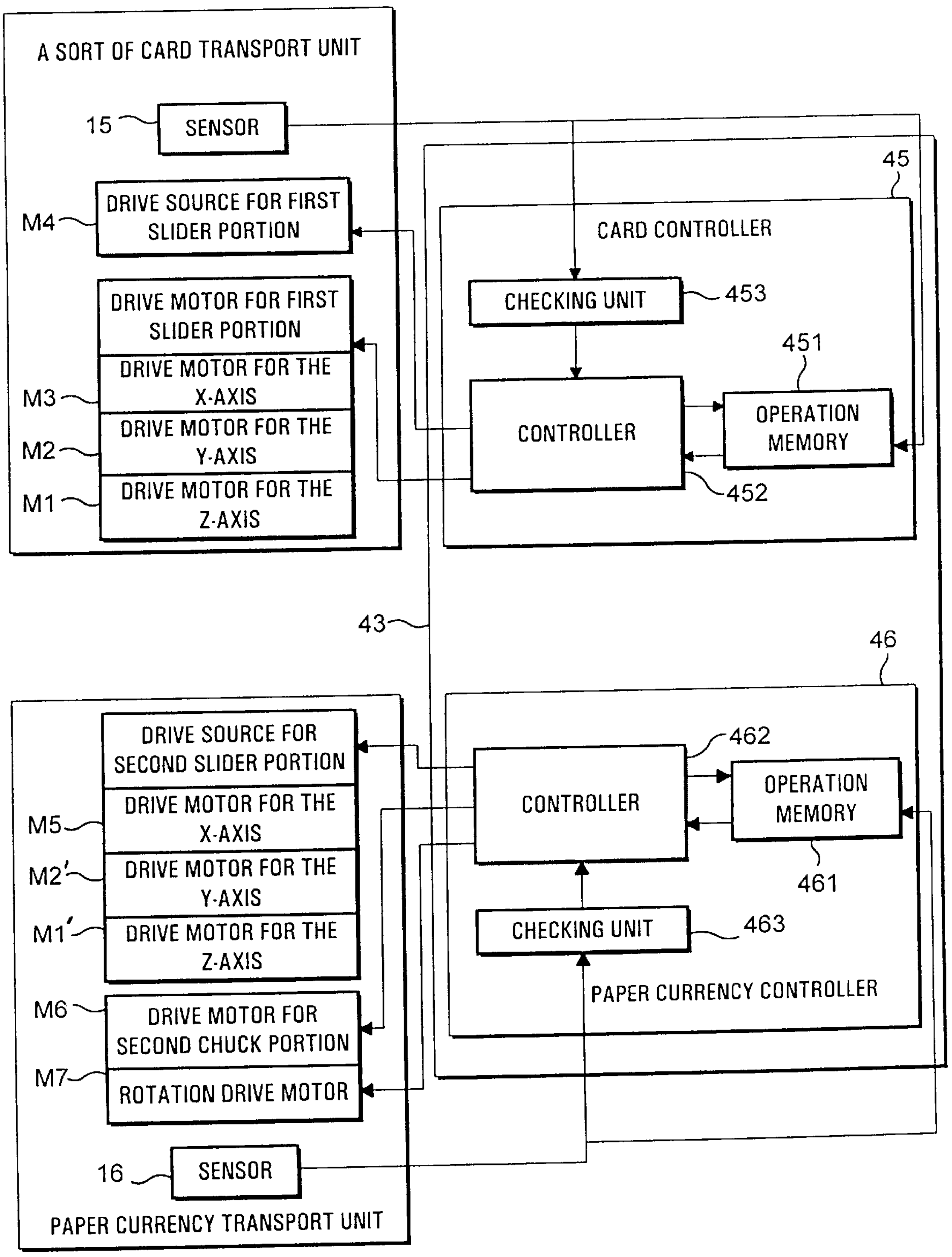
FIG. 8 is a block diagram showing a configuration of the controller of the present in the present invention.

Controller 43, as shown in FIG. 8, comprises:

first slider portion 22, which corresponds to a card access port 1 side;

card controller 45, which controls the drive source for first chuck portion 24; and paper currency controller 46, which controls drive sources for second slider portion 23, which corresponds to paper currency access port 2, and a second chuck portion 25.

Card controller 45 and paper currency controller 46 comprises:

operation memory portions 451, 461;

check portions 453, 463 for checking the types, sizes, and shapes of media B based on the photo output or image output from sensors 15, 16;

controllers 452, 462, which control operations of each of the drive motors based on the data from operation memory portions 451, 461 and check portions 453, 463. Each of the sensors 15, 16 are connected to checking portions 453, 463 and the output corresponding to media B or image data are stored in checking portions 453, 463. In operation memory portions 451, 461, the following data are stored:

the x, y, and z axis which are needed to indicate the positions for card access port 1 or paper currency depositing/receiving port 2;

the x, y, and z axis for guiding the media whose category is determined to a corresponding process unit. The system is designed to control each of the drive motors to locate the media whose category is determined to its corresponding process unit. In addition, cards controller 45 and paper currency controller 46 are designed not to interfere with each other during operation. Sensors 15, 16 put out signals to operation memories 451, 461. The checking portions 453, 463 are connected to controllers 452, 462 respectively. Controllers 452, 462 are connected to operation memories 451, 461.

Operation of the automatic transaction apparatus of this configuration is described herein.

Assume that media B, as shown in FIGS. 6 and 7, are inserted to card access port 1 and paper currency depositing/receiving port 2. As soon as sensors 15, 16, which are installed under a card access port 1 and paper currency depositing/receiving port 2, detect media B, they take the output signals into each of the checking portions 453, 463 shown in FIG. 8 for (comparison and) checking.

At the same time, sensors 15, 16 drive motors M1, M1' and M2, M2' such that first slider portion 22 and second slider portion 23 are positioned at the place which faces a card access port 1 and paper currency depositing/receiving port 2. As drive motors M1, M1' are driven belts 32, 33 move up and down the arrowed z direction (the z-axial direction) due to the motors rotation force.

At the same time, each of the base assemblies 29, 29', as shown in FIG. 5, move in the arrowed y direction (the y-axis direction, viewed from the card access port side which is the horizontal direction) by a required amount and stops as soon as they finish moving by this set amount.

As shown in FIGS. 6 and 7, when motors M3, M5 for moving chuck portions are rotated clockwise, the rotation of pinion gears 34, 39 of each of the motors is transmitted to racks 35, 40 via idlers 38, 41. First chuck portion 24 and second chuck portion 25 contactingly moves from the position marked with a solid line to the position marked with two-dotted chain lines facing toward the media operation panel side.

As they finish moving by a given amount, they face a card access port 1 or paper currency depositing/receiving port 2 on the media operation panel 3 side, then, they stop. As drive motor M3 is driven, drive motor M4 almost simultaneously is driven clockwisely such that magnetic card B1, inserted into a card access port 1 is taken into first chuck portion 24 by a pair of rollers. Then, the output form sensor 15 stops, and at the same time, the fact that magnetic card B1 is taken into a given position is detected by a sensor not illustrated and the drive motor M4 is stopped for the moment.

On the other hand, second chuck portion 25 hold paper currency B6 in such a way that when it moves by a given amount, drive motor M6 is driven for a given period of time and media group portion 42 is open, and at the same time, drive motor M6 is reverse driven at the position opposite paper currency depositing/receiving port 2 on the media operation panel 3 side to close media grip 42, thus paper currencies are held. To reduce the load on drive motor M6 when currencies B6 are held, it is preferable that the tip of media grip portion 42 is given flexibility or is elastically deformable. When the fact that media grip portion 42 grips paper currencies is detected, drive motor M5 moves to the right side by a given amount in FIG. 7 stopping output from sensor 16. Combined with discontinuation of output from sensor 16, drive motor M5 stop its operation at a given position for the moment.

On the first slider portion 22 side, in an attempt to transport magnetic card B1, which is held previously, to a card insertion slot on card reader 6, which is located on the housing unit side, drive motors M1, M2 are driven appropriately such that magnetic card B1 is positioned at set coordinates:

the right card passage opening formed on first chuck portion 24 of first slider portion 22 is positioned at the set coordinates which correspond to card insert slot of card reader 6 on the housing unit side;

drive motor M3 is rotated counterclockwise;

drive motor M4 is rotated clockwise;

first slider portion 22 is contactingly moved to the right in FIG. 6 to drive each of the pairs of rollers;

magnetic card B1 held on first chuck portion 24 is transported to insertion slot 6*a* of card reader 6.

Within card reader 6 in the housing unit, data recording or reproduction (card processing) is performed on magnetic card B1 as usual. After this card processing is finished, magnetic card B1 is ejected from the card reader 6 and held in the card passage in first chuck portion 24 until it is transported to the position which faces a card access port 1 formed on the media operation unit. Then, drive motor M3 is rotated clockwise while drive motor M4 is driven counterclockwise to eject magnetic card B1, which is received from card reader 6, to outside the apparatus through a card access port 1.

On the second slider portion 23 side, in an attempt to transport paper currencies B6, which are held previously, to paper currency dispensers 7A, 7B, 7C, drive motors M1', M2' are driven appropriately such that paper currencies B6 are positioned at the set coordinates. When second slider portion 23 reaches the set coordinates, drive motors M5, M7 are rotated counterclockwise.

Second slider portion 23 is contactingly moved toward the right in FIG. 7 while rotating the slider portion 23 180° around the O axis line such that second chuck portion 25 is located in the vicinity of paper dispenser 7A. Then, drive motors M5, M7 are stopped;

drive motor M6 is positive reverse rotated for a predetermined time;

grip portion 42 opens/closes;

paper currency B6 is guided to paper currency depositing/receiving port 7 of paper currency dispenser 7A.

In paper currency dispenser 7A, the number of paper currencies B6 transported is counted and is indicated on display 18 of media operation panel 3. When some paper currencies B6 are paid as change, the following operation is performed:

each of the paper currency dispensers count paper currencies B6 according to the types of the currencies;

each of the drive motors drive second slider portion 23 together with second chuck portion 25 to the paper currency dispensers which perform accounting for the change to grip the paper currency. Then, each drive motor is controlled until it reaches the coordinates at which the paper currency depositing/receiving port 2 is formed on the media operation unit;

drive motor M7 is rotated clockwise at which second chuck portion 25 faces the depositing/receiving port 2;

second chuck portion 25 is rotated around the O axis line to locate knob 42 at the paper currency depositing/receiving port 2 side.

Drive motor M5 is then, rotated clockwise such that second chuck portion 25 contactingly moves toward paper currency depositing/receiving port 2;

finally, drive motor M6 is rotated positively reversely for a predetermined time to open/close knob 42;

paper currencies received through the paper currency dispenser is ejected through paper currency depositing/receiving port 2 to outside the apparatus.

In this embodiment, only operations with respect to magnetic card B1 and paper currency B6 are described. However, magnetic card B1 may be ejected together with receipt 5 through a card access port 1. This may be done by the following operations:

the amount of paper currency B6 paid or deposited from/to the system or other data may be printed by receipt printer 5.

When magnetic card B1 is collected, first chuck 22 is positioned at the coordinates x, y, z, which corresponds to receipt printer 5.

If one wants to insert statement book B3 through a card access port 1, one may control first slider portion 22 such that it is positioned at the coordinates x, y, z, which correspond to the statement printer 4, which processes statement book B.

In the present invention, magnetic card B1, IC card B2, statement books B3, B4 are inserted/ejected through a card access port 1. However, another port may be formed to specifically handle statement books B3, B4. To do so, one may store the x, y, z coordinates specific to statement books in a memory of controller 43 to control each of the drive motors based on the stored data.

If one wants to replace media operation panel 3 with panels 10, 11, 12 shown in FIG. 2(*a*), (*b*), (*c*), one may want to store the x, y, z, coordinates in a memory of controller 43 for the card access port or paper currency depositing/receiving port formed on each of the panel. In this way, without changing the layout of each of the process portions in housing unit 9, the media operation panel can be renewed. To describe this operation in detail, one stores the x, y, z, coordinates for the a card access port or paper currency depositing/receiving port formed on each of the media operation panel in operation memory portions 451, 461 in advance. Then, by selecting the type of media operation panel, one can automatically specify the x, y, z coordinates of corresponding a card access port or paper currency depositing/receiving port.

As described, by putting transport unit 20 between media operation unit 3 and housing unit 9 to integrate the apparatus, a long transport passage which was required in conventional technology can be eliminated. The possibility of jamming of media B or resulting damage can be reduced. With this configuration, the apparatus can be smaller and can be applied to a variety of media operating panels without re-designing the internal layout of housing unit 9. When using a media operation panel with a slanted front end, a card access port 1 or paper currency depositing/receiving port 2 may be slanted at an angle. In this case, first and second slider portions 22, 23 may be mounted on belts 32, 33 at an angle such that media B can be deposited/received smoothly. Or, first and second slider portions 22, 23 may be constructed with base assemblies, which are fixed onto belts 32, 33, and transport members, which are movable on the base assembly in the z direction, and first and second chucks 24, 25 may be attached to each of the transport members.

In this embodiment, slider portions 22, 23, chuck portions 24, 25 and a drive means are formed such that they can operate independently with respect to card access port 1, and paper currency depositing/receiving port 2. Therefore, two different types of media card C and paper currencies A, can be controlled simultaneously, providing efficient media processing.

When the transaction time for the automatic transaction apparatus is not required to be very short for media B, first slider portion 22 and second slider portion 23 may be formed on one belt, for example, on belt 33. Then first and second chuck portions 24, 25 may be contactingly movably mounted thereon to construct a transport unit. With this configuration, one transport unit can act as first slider portion 22 and second slider portion 23, which are drive means for moving in the y and z directions, thus reducing manufacturing cost.

Controller 43 comprises card controller 45 and paper currencies controller 46. However, a controller, an operation memory, and a checking portion may be integrated to make a control unit. This configuration reduces the number of components which constitute the controller, thus reduce the cost of manufacturing apparatus.

Paper currency dispensers 7A, 7B, 7C are inserted into the apparatus from the back panel 9*b* side of the automatic transaction apparatus. As shown in FIG. 1, automatic transport system 71, which is driven with respect to the system, may be given a paper currency dispenser 70 for filling and may be replaced with paper currency dispensers 7A, 7B, 7C.

In the automatic transaction apparatus of the present invention, a transport unit which is controlled by a controller is arranged movably between the operating unit and housing unit. Even if the positions of a card access port or paper currency depositing/receiving port on a operation unit are changed, the layout of equipment within the housing unit does not need to be redesigned on a medium or media operating unit basis. This makes it possible to use a system of the same design for different media, thus reducing manufacturing costs of the apparatus. In addition, if the transport unit requires additional transport rollers or passages to transport a card or paper currencies, the additions to the configuration are minimal. This reduces the possibility of damaging media and also reduces the size of the apparatus.

Also, by using a driving means which is capable of detecting up-down and right-left positions for moving the transport unit, even if a plurality of slider portions exist, their transport motion can be controlled without interfering with each other; thus media can be processed efficiently and smoothly.

While the foregoing description and drawings represent the preferred embodiments of the present invention, it will be obvious to those skilled in the art that various changes and modifications may be made therein without departing from the true spirit and scope of the present invention.

What is claimed is:

1. An automatic transaction apparatus comprising:

a media operation unit having a card access port and paper currency depositing/receiving port;

a housing unit including a card process portion and a plurality of paper currency dispenser portions which are positioned at the side of said card access port and said paper currency depositing/receiving port;

a slider portion arranged to be movable in a given direction behind said card access port and said paper currency depositing/receiving port, and in front of said card process portion and said plurality of paper currency dispenser portions;

a transport unit, supported by said slider portion, and having a chuck portion which is movable between said operation unit and said housing unit;

a controller for controlling movement of said slider portion and chuck portion;

said media operation unit being designed to be replaceable on said housing unit;

said slider portion being designed so that it moves to a position corresponding to said card insertion portion or paper currency depositing/receiving portion on said media operation unit to receive different media from said chuck portion;

said slider portion being also designed so that it moves to the position corresponding to said card process portion or said plurality of paper currency dispenser portions of said housing unit to deliver said different media thereto;

wherein said slider portion comprises:

a first slider portion having a first chuck portion which receives a medium inserted through said card access port; and a second slider portion having a second check portion which receives said paper currency;

said first and second slider potions being able to move independently from each other.

2. The automatic transaction apparatus as set forth in claim 1, wherein said transport unit comprises:

z-axis drive means for transporting said slider portion up and down in the z-axis direction; and drive means for transporting said chuck portion in a horizontal direction.

3. The automatic transaction apparatus as set forth in claim 2, wherein said transport unit comprises:

x-axis drive means for transporting said chuck portion in a direction horizontal to the x-axis; and y-axis drive means for transporting said slider portion in a direction horizontal to the y-axis, said direction being orthogonal to said x-axis direction.

4. The automatic transaction apparatus as set forth in claim 3, wherein each of said x-axis drive means, y-axis drive means, and z-axis drive means has a motor which is capable of detecting positions.

5. The automatic transaction apparatus as set forth in claim 1, wherein said cards are a card or a statement book;

said housing unit being equipped with:

a statement printer; and a sensor at said card access port for checking whether the article inserted from said card access port is a card or a statement book; and based on the output data from said sensor, said slider portion is moved together with said chuck portion to the position corresponding to said card process portion or statement printer to deliver said card or statement book to said card process portion or said statement printer.

6. The automatic transaction apparatus as set forth in claim 5, wherein drive means for transporting said slider portion is formed on said housing unit; and said slider portion is formed with drive means for transporting said chuck portion between said operation unit and said housing unit.

7. The automatic transaction apparatus as set forth in claim 6, wherein the drive means formed on said slider portion comprises:

a drive motor, which transports said chuck portion to the side of said media operation unit; and a motor, which rotates in-take rollers for taking cards into said chuck portion.

8. The automatic transaction apparatus as set forth in claim 1, wherein said controller portion comprises:

a card control portion which controls the drive source for said first slider the drive source for said first chuck portion; and a paper currency control portion which controls the drive source for said second slider portion and the drive source of said second chuck portion.

9. The automatic transaction apparatus as set forth in claim 8, wherein each of said card control portion and said paper currency control portion comprises:

an operation memory portion in which a given program is stored and a controller which controls operation of said drive source;

and wherein, in said operation memory portion, the x, y, z coordinates for guiding a medium are stored such that they indicate the position of said card access port and said paper currency depositing/receiving port and the position of a process portion which corresponds to a medium.

10. The automatic transaction apparatus as set forth in claim 9, wherein said housing unit which faces said card access port is equipped, in the up and down direction, with a statement printer, a receipt printer, and a card reader;

said housing unit which faces said paper currency depositing/receiving port is in the up and down layered direction, equipped with a plurality of paper currency dispenser portions and an envelope receiver.

11. The automatic transaction apparatus as set forth in claim 1, wherein said media operation unit has a design selected from the following:

one which a user of the media operating unit can operate his media along his waist line as he stands;

one which a user can operate at his breast line while standing;

one which a user can operate as he sits; and one which a user can operate in a car.

12. The automatic transaction apparatus as set forth in claim 11, wherein said transport unit comprises:

z-axis drive means for transporting said slider portion in the up and down direction, which is the z-axis direction; and drive means for transporting said chuck portion horizontally;

wherein said controller comprises:

z-axis drive means of said slider portion; and a controller, which controls said drive means of said chuck portion;

wherein said operation memory portion stores the x, y, z coordinates for indicating:

the position of said card access port and said paper currency depositing/receiving port; and the distance from a medium to each of its corresponding process units;

each of the drive sources being controlled such that said chuck portion is positioned at said coordinates.

13. The automatic transaction apparatus as set forth in claim 12, wherein, in said operation memory portion, the x, y, z, coordinates, which indicate the position of said card access port and said paper currency depositing/receiving port which corresponds to said different types of media operation units are stored;

when the type of media operation unit is changed, the x, y, z coordinates of said card access port and said paper currency depositing/receiving port which correspond to the new media operation unit are changed based on the stored data on the new coordinates; each of the driving source being controlled to transport said chuck portion to the new coordinates.

* * * * *